US011901984B2

(12) United States Patent
Kotilainen

(10) Patent No.: US 11,901,984 B2
(45) Date of Patent: Feb. 13, 2024

(54) ANTENNA SOFT SWITCHING SOLUTION OF AN AOD DIRECTION FINDING TRANSMITTER

(71) Applicant: COREHW SEMICONDUCTOR OY, Tampere (FI)

(72) Inventor: Petri Kotilainen, Tampere (FI)

(73) Assignee: Corehw Semiconductor OY, Tampere (FI)

(*) Notice: Subject to any disclaimer, the term of this patent is extended or adjusted under 35 U.S.C. 154(b) by 124 days.

(21) Appl. No.: 17/613,355

(22) PCT Filed: May 28, 2019

(86) PCT No.: PCT/FI2019/050410
§ 371 (c)(1),
(2) Date: Nov. 22, 2021

(87) PCT Pub. No.: WO2020/240074
PCT Pub. Date: Dec. 3, 2020

(65) Prior Publication Data
US 2022/0224385 A1 Jul. 14, 2022

(51) Int. Cl.
H04L 5/12 (2006.01)
H04B 7/06 (2006.01)
(Continued)

(52) U.S. Cl.
CPC .............. H04B 7/0608 (2013.01); G01S 1/08 (2013.01); H01Q 3/24 (2013.01); H04B 7/0617 (2013.01)

(58) Field of Classification Search
CPC ....... H04B 7/0608; H04B 7/0617; G01S 1/08; H01Q 3/24
(Continued)

(56) References Cited

U.S. PATENT DOCUMENTS 5,719,580 A * 2/1998 Core .................. G01S 7/4008
342/132
5,835,855 A 11/1998 Burns
(Continued)

FOREIGN PATENT DOCUMENTS

EP 1230746 A1 8/2002
EP 1808037 A1 7/2007

OTHER PUBLICATIONS

International Search Report and Written Opinion dated Feb. 7, 2020 in PCT/FI2019/050410 (16 pages).
(Continued)

Primary Examiner — Zewdu A Kassa
(74) Attorney, Agent, or Firm — Meunier Carlin & Curfman LLC

(57) ABSTRACT

The invention relates to an antenna soft switching system of an Angle of Departure, AoD, direction finding transmitter unit. The soft switching system comprises: a timing unit for obtaining at least a starting time of a switching event, a switching network arranged on a radio frequency, RF, signal path between an RF port and a first antenna port and a second antenna port, and a generator unit for generating at least one waveform for controlling the switching network. The generator unit is configured to control the switching network so that the amplitude of the RF signal is switched substantially smoothly from the first antenna port to the second antenna port so that level of unwanted emissions of a transmitted RF spectrum of the AoD directional finding transmitter unit are reduced. The invention relates also to an AoD direction finding transmitter unit comprising the antenna soft switching system and to an antenna soft switching method for an AoD directional finding transmitter unit.

16 Claims, 11 Drawing Sheets

(51) Int. Cl.
*G01S 1/08* (2006.01)
*H01Q 3/24* (2006.01)

(58) Field of Classification Search
USPC ................ 375/262, 261, 259, 219, 295, 316
See application file for complete search history.

(56) References Cited

U.S. PATENT DOCUMENTS

| | | | | |
|---|---|---|---|---|
| 2011/0105023 A1* | 5/2011 | Scheer | ................... | H01Q 1/242 |
| | | | | 455/193.1 |
| 2013/0095869 A1* | 4/2013 | Christoffersson | ........ | H04B 1/40 |
| | | | | 455/501 |
| 2019/0007086 A1* | 1/2019 | Mofidi | ................... | H04B 1/006 |
| 2019/0033420 A1* | 1/2019 | Knaappila | ............. | G01S 5/0242 |

OTHER PUBLICATIONS

Anonymous, "Soft vs hard antenna commutation—RDF—Radio Direction Finding", Nov. 24, 2017, XP055662341, URL:https://radiodirectionfinding.wordpress.com/de-antennedriver/.
International Preliminary Report on Patentability dated Jul. 30, 2021 in PCT/FI2019/050410 (9 pages).

* cited by examiner

ANTENNA SOFT SWITCHING SOLUTION OF AN AOD DIRECTION FINDING TRANSMITTER

CROSS REFERENCE TO RELATED APPLICATIONS

This application is a United States National Phase Patent Application of International Patent Application Number PCT/FI2019/050410, filed on May 28, 2019, which is incorporated by reference herein in its entirety.

TECHNICAL FIELD

The invention concerns in general the technical field of direction finding systems. Especially the invention concerns soft switching of a direction finding transmitter.

BACKGROUND

Indoor location and navigation have gathered a great deal of attention recently. While the outdoor navigation is widely based on GNSS satellite services, there is currently no ubiquitous technology or service to facilitate indoor navigation. The existing indoor navigation solutions are based on e.g. wireless Local Area Network (wireless LAN), Bluetooth low energy (BLE), visible or infrared light etc. All of these solutions have more or less limited coverage and location accuracy.

An emerging technology solution for indoor location is based on radio direction finding systems. For that purpose, the radio direction finding systems may be divided into systems using Angle of Arrival (AoA) method and Angle of Departure (AoD) method. Both methods utilize an antenna array constructed of several distinct antenna elements, which are physically separated from each other. Having more antennas in the antenna array generally improves positioning accuracy and positioning system tolerance against impairments caused by radio signal propagation environment. In a simple direction finding solution one of the antenna elements of the antenna array is active at a time and the active antenna is changed over the time.

In the AoA method the antenna array is used for reception. The receiver antenna element is changed to find the direction of incoming radio wave-front from a transmitter and the position is defined from the observed phase differences collected from the receiver antenna elements. FIG. 1 schematically illustrates a simple example of the principle of AoA direction finding system 100. The AoA radio direction finding system 100 comprises a transmitter unit 102 and a receiver unit 104. The transmitter unit 102 comprises a transmitting antenna 106 and a RF transmitter 108, e.g. BLE transmitter. The receiver unit 104 comprises a receiving antenna array, which comprises in this simple example four antenna elements 110a-110d. Furthermore, the receiver unit 104 comprises an antenna switch unit 112 to switch between the antenna elements 110a-110d, a RF receiver 114, e.g. BLE receiver, and an AoA estimation unit 116. The AoA estimation unit 116 of the receiver unit 104 estimates the angle of arrival of the signal by using the sampled receiver signal.

In the AoD method the antenna array is used for transmission. The transmitter signal is fed consecutively to each antenna element of the antenna array for a short time period to produce signal in receiving end. The transmitted signal is switched between the antenna elements according to a pre-determined antenna switching pattern. The antenna switching pattern defines the order in which the antennas in the antenna array are activated. The switching generates a directionally variable phase-modulated radiated signal, which may be used for defining estimating the relative direction between a distant receiver and the transmitter. The estimation is based on the received signal, and the receiver does not need to have a directional antenna. FIG. 2 schematically illustrates a simple example of the principle of AoD direction finding system 200. The AoD radio direction finding system 200 comprises a transmitter unit 202 and a receiver unit 204. The transmitter unit 202 comprises a transmitting antenna array, which comprises in this simple example four antenna elements 206a-206d. Furthermore, the transmitter unit 204 comprises an antenna switch unit 212 to switch the transmitted signal between the antenna elements 206a-206d and a RF transmitter 208, e.g. BLE transmitter. The receiver unit 204 comprises a receiving antenna 210, a RF receiver 214, e.g. BLE receiver, and an AoD estimation unit 216. The AoD estimation unit 216 of the receiver unit 204 estimates the angle of arrival of the signal by using the sampled receiver signal.

In the AoD method the switching of the transmitted signal from one antenna element to another antenna element may cause unwanted spreading of radiated RF spectrum, if the switching is done too rapidly. This spreading may cause interference to other radio receivers nearby the AoD transmitter and may potentially violate the regulatory requirements for spectral emissions, or cause non-compliance with relevant standards, e.g. Bluetooth.

In the AoA method the rapid switching from one antenna element to another antenna element may cause unwanted spurious responses from nearby radio transmitters.

Typically, soft switching has been used in commercial direction finding receivers, e.g. AoA receivers.

However, there is need to develop further solutions in order to reduce radiated spectral emissions of an AoD transmitter.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an antenna soft switching system, an AoD direction finding transmitter unit, and an antenna soft switching method for an AoD direction finding transmitter unit. Another objective of the invention is that the antenna soft switching system, the AoD direction finding transmitter unit, and the antenna soft switching method for an AoD direction finding transmitter unit reduces interference caused to radio receivers of other nearby systems.

The objectives of the invention are reached by an antenna soft switching system, an AoD direction finding transmitter unit, and an antenna soft switching method as defined by the respective independent claims.

According to a first aspect, an antenna soft switching system of an Angle of Departure, AoD, direction finding transmitter unit is provided, wherein the soft switching system comprises: a timing unit for obtaining at least a starting time of a switching event, a switching network arranged on a radio frequency, RF, signal path between an RF port and a first antenna port and a second antenna port, and a generator unit for generating at least one waveform for controlling the switching network, wherein the generator unit is configured to control the switching network so that the amplitude of the RF signal is switched substantially smoothly from the first antenna port to the second antenna port so that level of unwanted emissions of a transmitted RF spectrum of the AoD direction finding transmitter unit are reduced.

The switching network may comprise at least two switching elements, wherein the at least two switching elements are resistive switching devices, fully reactive switching devices, partially reactive switching devices, or active switching devices.

The at least two switching devices may utilize junction gate field-effect transistors, JFETs; Metal-oxide-semiconductor field-effect transistors, MOSFETs; metal-semiconductor field-effect transistors, MESFETs; pseudomorphic high electron mobility transistors, PHEMTs; PIN diodes; or any other suitable RF switching devices.

The generator unit may comprise an analog ramp generator.

Alternatively, the generator unit may comprise a digital waveform generator, a digital to analog converter, and a reconstruction filter.

The at least two switching devices may be digitally controlled attenuators.

The generator unit may comprise a digital waveform generator and a waveform encoder configured to convert the waveform generated by the digital waveform generator into control signals of the digitally controlled attenuators.

Alternatively, the generator unit may comprise a counter and the waveform may be encoded into the at least two switching devices.

The switching network may be implemented as a part of an antenna switch configured to change active antenna port from the first antenna port to the second antenna port during the switching event, wherein the generator unit may be configured to control the switching network so that: the amplitude of the RF signal at the first antenna port is substantially smoothly ramped down, and simultaneously the amplitude of the RF signal at the second antenna port is substantially smoothly ramped up.

Alternatively, the switching network may be a separate switching network providing a centralized soft switching system, wherein the generator unit may be configured to control the switching network so that: the amplitude of the RF signal at the first antenna port is substantially smoothly ramped down; and simultaneously the amplitude of the RF signal at a reference port is ramped up substantially smoothly, wherein the antenna switch is configured to changing active antenna port while the RF signal is led to the reference port; and wherein the generator unit may further be configured to control the switching network so that the amplitude of the RF signal at the reference port is substantially smoothly ramped down and simultaneously the amplitude of the RF signal at second antenna port is substantially smoothly ramped up.

Alternatively, the switching network may be a separate switching network providing a centralized soft switching system and the first antenna port may belong to a first antenna group and the second antenna port may belong to a second antenna group, wherein the generator unit may be configured to control the switching network so that: the amplitude of the RF signal at the first antenna group is substantially smoothly ramped down, and simultaneously the amplitude of the RF signal at the second antenna group is substantially smoothly ramped up, wherein the second antenna port is pre-selected as the active antenna of the second antenna group.

According to a second aspect, an Angle of Departure, AoD, direction finding transmitter unit is provided, wherein the AoD direction finding transmitter unit comprises the antenna soft switching system described above.

According to a third aspect, an antenna soft switching method for an AoD direction finding transmitter unit is provided, wherein the method comprises controlling, by a waveform generated by a generator unit, a switching network so that the amplitude of a radio frequency, RF, signal is switched substantially smoothly from a first antenna port to a second antenna port so that level of unwanted emissions of a transmitted RF spectrum of the AoD direction finding transmitter unit are reduced.

The switching network may be implemented as a part of an antenna switch changing active antenna port from the first antenna port to the second antenna port during the switching event, wherein the controlling of the switching network may comprise: ramping down substantially smoothly the amplitude of the RF signal at the first antenna port, and simultaneously ramping up substantially smoothly the amplitude of the RF signal at the second antenna port.

Alternatively, the switching network may be a separate switching network providing a centralized soft switching system, wherein the controlling of the switching network may comprise: ramping down substantially smoothly the amplitude RF signal at the first antenna port; simultaneously ramping up substantially smoothly the amplitude of the RF signal at a reference port; changing, by a switching network of an antenna switch, active antenna port from the first antenna port to the second antenna port, while the RF signal is led to the reference port; ramping down substantially smoothly the amplitude of the RF signal at the reference port; and simultaneously ramping up substantially smoothly the amplitude of the RF signal at second antenna port.

Alternatively, the switching network may be a separate switching network providing a centralized soft switching system and the first antenna port may belong to a first antenna group and the second antenna port may belong to a second antenna group, wherein the method may comprise: ramping down substantially smoothly the amplitude of the RF signal at the first antenna group, and simultaneously ramping up substantially smoothly the amplitude of the RF signal at the second antenna group, wherein the second antenna port is pre-selected as the active antenna of the second antenna group.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
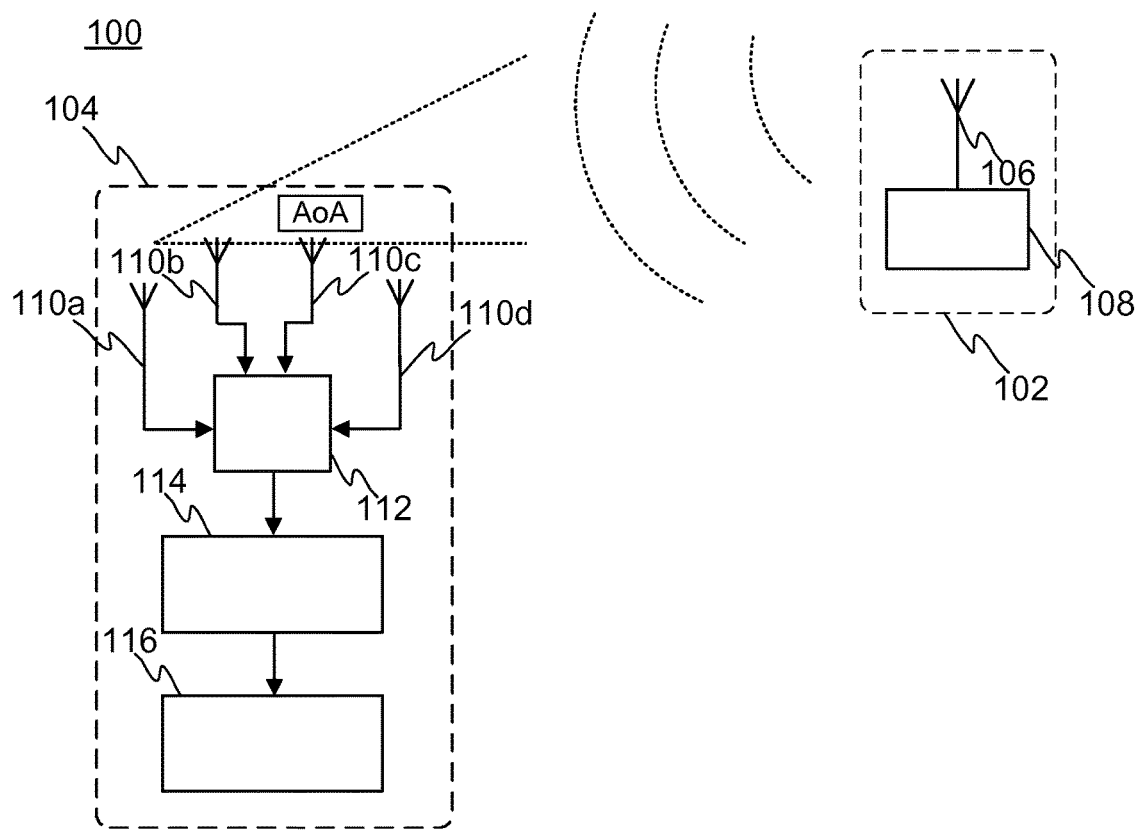
FIG. 1 illustrates schematically a simple example of the principle of Angle of Arrival (AoA) direction finding system.
Figure 2:
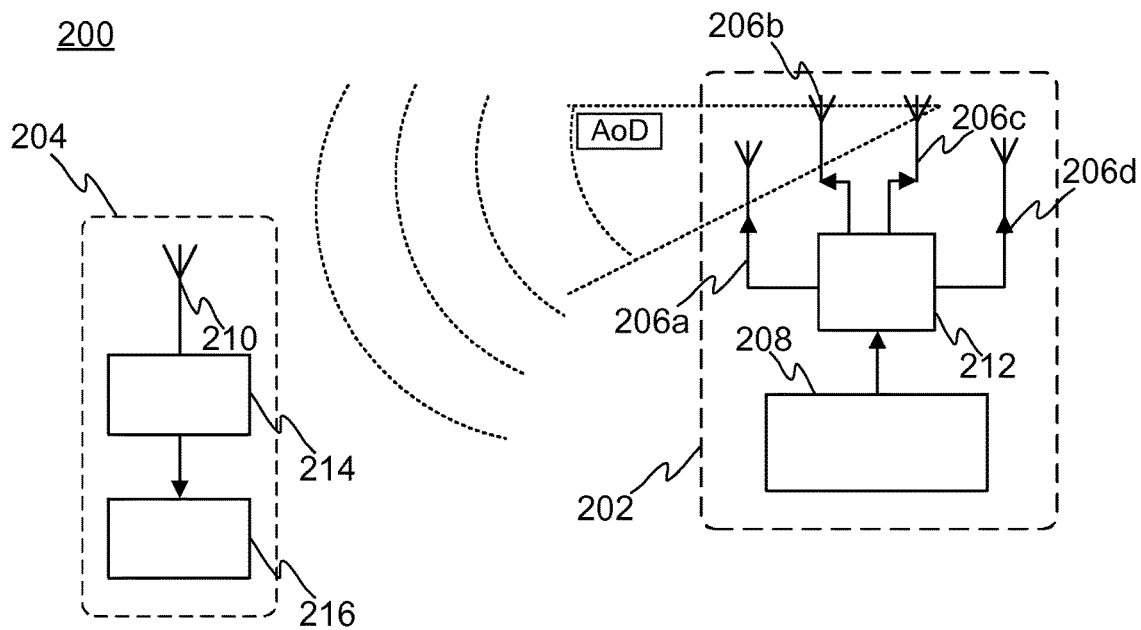
FIG. 2 illustrates schematically a simple example of the principle of Angle of Departure (AoD) direction finding system.
Figure 3:
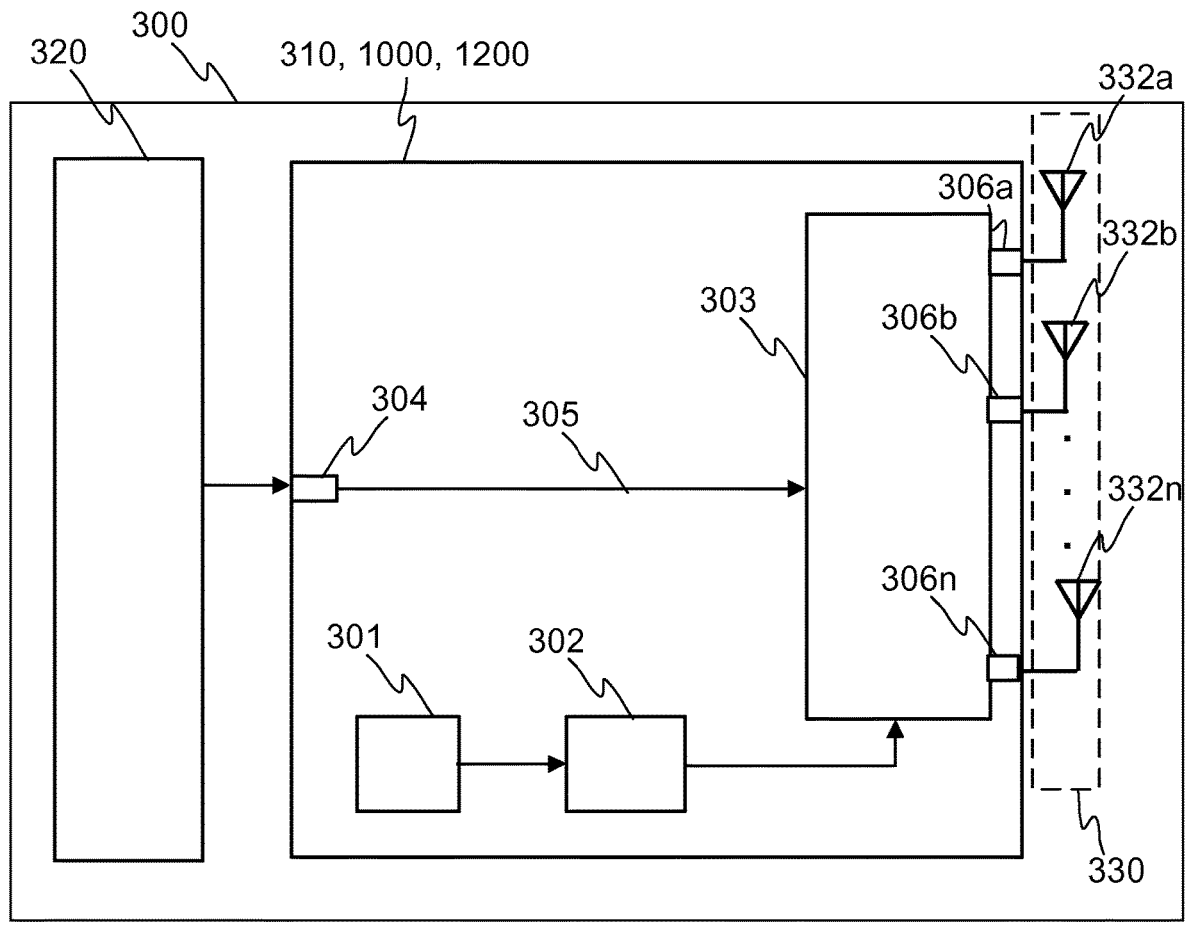
FIG. 3 illustrates schematically an example an Angle of Departure (AoD) direction finding transmitter unit according to the invention.

FIG. 3 illustrates schematically an example an Angle of Departure (AoD) direction finding transmitter unit 300 according to the invention. The AoD direction finding transmitter unit 300 may comprise an antenna soft switching system 310, 1000, 1200 according to any of the embodiments of the invention as will be described in this application. The AoD transmitter unit 300 further comprises at least one radio frequency (RF) transmitter module 320 for generating at least one RF signal to be transmitted and at least one antenna array 330 comprising at least two antenna elements 332a-332n via which the at least one RF signal 305 may be transmitted by feeding the at least one RF signal 305 consecutively to each antenna element 332a-332n of the at least one antenna array 330. The antenna soft switching system 310 may be implemented as a part of an antenna switch configured to perform switching between the antenna elements 332a-332n, i.e. the antenna switch comprises a switching network formed by a plurality of switching devices configured to select consecutively the antenna element 332a-332n of the at least one antenna array 330 via which the RF signal is transmitted. In other words, the antenna switch is configured to consecutively activate each antenna element 332a-332n of the at least one antenna array 330 at a time. The AoD transmitter unit 300 may transmit the RF signal via the active antenna element so that each antenna element is consecutively changed, i.e. switched, as the active antenna element. Each antenna element 332a-332n may be connected to respective at least antenna port 306a-306n to connect the antenna array 330 to the antenna soft switching system 310 and to the antenna switch. This means that the number or antenna elements 332a-332n of the at least one antenna array 330 defines the number of the antenna ports 306a-306n. For example, if the at least one antenna array 330 comprises 10 single-end antenna elements, the number of antenna ports 306a-306n is 10. According to another example, if the at least one antenna array 300 comprises 10 differentially fed balanced antenna elements 332a-332n, the number of antenna ports 306a-306n is 20. According to yet another example, if the at least one antenna array 330 comprises 10 differentially fed balanced antenna elements 332a-332n and 10 single-end antenna elements 332a-332n, the number of antenna ports 306a-306n is 30. The antenna switch may comprise a conversion unit configured to provide single-end to differential conversion of the at least one RF signal for providing at least one positive phase RF signal RF+ and at least one negative phase RF signal RF− for each differentially fed balanced antenna elements 332a-332n of the at least one antenna array 330.

Figure 4:
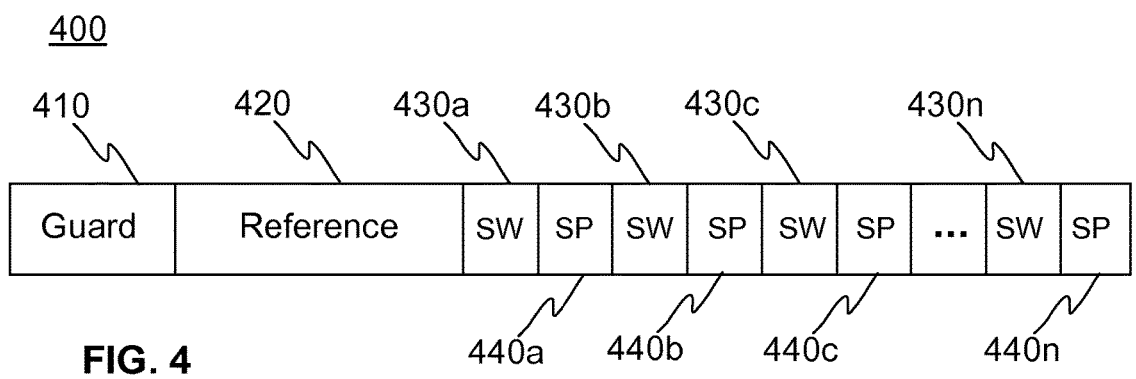
FIG. 4 illustrates schematically an example structure of a CTE frame.
Figure 5:
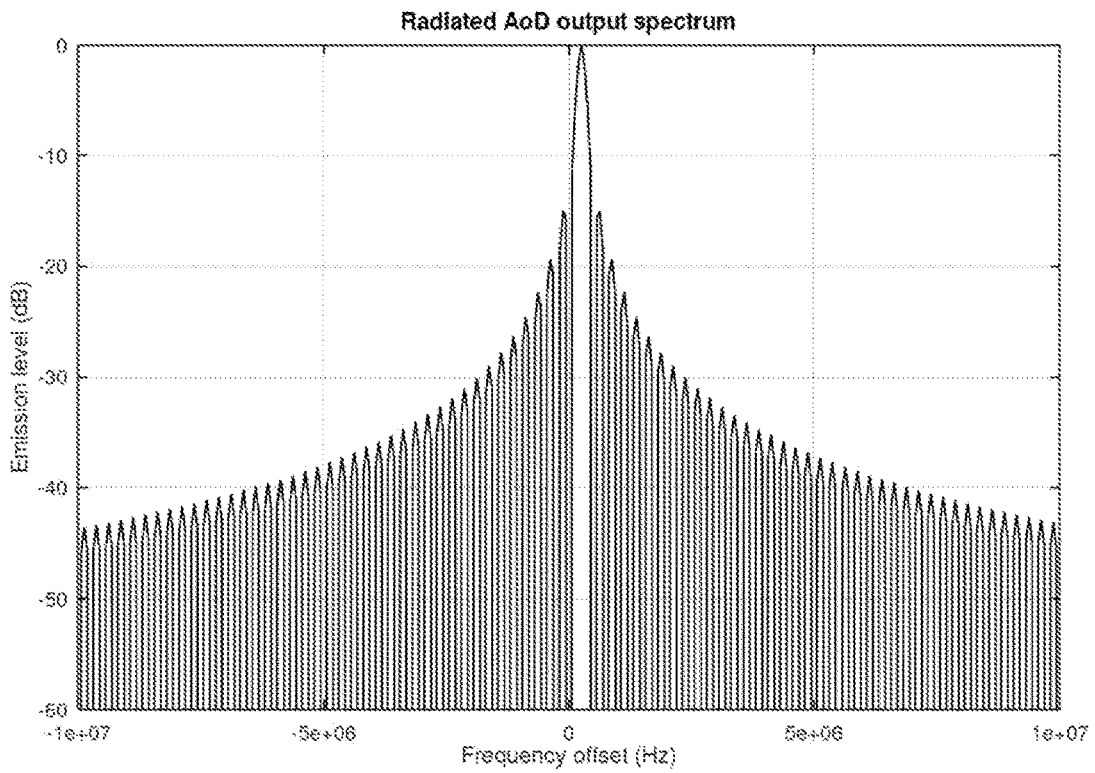
FIG. 5 illustrates schematically an example of transmitted RF spectrum with instantaneous switching.

In the AoD transmitter unit 300 the switching of the RF signal to be transmitted from one antenna element, i.e. a first antenna element 332a, to another antenna element, i.e. a second antenna element 332b, may cause unwanted spreading, i.e. unwanted emissions, of the transmitted, i.e. radiated, RF spectrum, if the switching is instantaneous. The unwanted emissions of the transmitted RF spectrum may be out-of-channel spectral emissions, i.e. emissions at frequencies being offset from the transmission frequency. This spreading may cause interference to radio receivers of other systems nearby the AoD transmitter unit 300, may potentially violate the regulatory requirements for spectral emissions, and/or may cause non-compliance with relevant standards, e.g. Bluetooth. The AoD functionality in direction finding has been included in a Bluetooth SIG standard version 5.1. The AoD functionality of the direction finding systems is enabled by adding so called Constant Tone Extension (CTE) period, i.e. CTE frame 400, at the end of a transmitted Bluetooth low energy (BLE) advertisement packet frame. FIG. 4 illustrates an example structure of a CTE frame 400 as defined in BLE 5.1. The CTE frame may comprise the following structure: a guard period 410, a reference period 420, and a plurality of alternating switch slots 430a-430n and sample slots 440a-440b. The guard period 410 is a first part of the CTE and no useful information is transmitted during the guard period 410. The duration of the guard period 410 is 4 microseconds. The reference period 420 is for the phase reference for subsequent measurements. The duration of the reference period 420 is 8 micro-seconds. Each sample slot 440a-440n is the time reserved for phase measurement, i.e. the actual measurement, from the active antenna element. The duration of each sample slot 440a-440n is 1 microsecond or 2 microseconds. Each switch slot 430a-430n is the time reserved for changing, i.e. switching, the active antenna port. The duration of each switch slot 430a-430n is 1 microsecond or 2 microseconds. It means that the switching of the transmitted RF signal from the first antenna element 332a to the second antenna element 332b needs to be performed during 1 microsecond or 2 microseconds, which may be considered instantaneous switching and cause wideband spreading of the transmitted RF spectrum. FIG. 5 illustrates an example of transmitted RF spectrum, wherein the instantaneous switching causes spreading of the transmitted RF spectrum, which may be seen as high out-of-channel spectral emissions of the RF spectrum. In this example, the level of the out-of-channel spectral emissions may be approximately between −30 dB and −15 dB with small offset frequencies (less than ±2.5 MHz from the transmit frequency) and approximately between −45 dB and −30 dB with higher offset frequencies (between ±2.5 MHz-±10 MHz).

The soft switching system 310 comprises a timing unit 301, a generator unit 302, and a switching network 303. The switching network 303 is arranged on the RF signal path 305 between at least one RF port 304 and the antenna ports 306a-306n. The antenna soft switching system 310 may be connected to the RF transmitter module 320 via the at least one RF port 304 to provide at least one RF signal 305 from the RF transmitter module 320 via the antenna ports 306a-306n to each antenna element connected to the respective antenna port at a time. The timing unit 301 is configured to obtain at least a starting time of the switching event and optionally also a termination time of the switching event. The timing unit 301 may be configured to define at least the starting time of the switching event and optionally also a termination time of the switching event. Alternatively or in addition, the timing unit 301 may receive, e.g. as a control signal, the starting time of the switching event and/or the termination time of the switching event from an external control unit, e.g. a switch control unit of the antenna switch. Alternatively or in addition, the termination time of the switching event may be defined by a waveform generated by the generator unit 302. The generator unit 302 is configured to generate at least one waveform for controlling the switching network 303. The generator unit 302 is configured to control the switching network 303 so that the amplitude of the RF signal 305 is switched substantially smoothly, i.e. gradually, from the first antenna port 306a to the second antenna port 306b so that the level of unwanted emissions of the transmitted RF spectrum of the AoD transmitter unit 300 caused by the switching event are reduced. During the switching event the impedance seen by the at least one RF port 304 may be maintained constant. With the term "switching event" is meant throughout this application the switching the RF signal 305 from one antenna port to another. A sequence of switching events, i.e. switching sequence comprises a plurality of switching events. Above the invention is defined so that the switching takes place from the first antenna port 306a to the second antenna port 306a, however the inventive idea is directly applicable in switching between any two antenna ports 306a-306n. Moreover, because each antenna element 332a-332e of the at least one antenna array 330 is connected to at least antenna port 306a-306n, the switching from one antenna port to another antenna port causes also switching from one antenna element to another antenna element, i.e. switching from first antenna element 332a connected to the first antenna port 306a to the second antenna element 332b connected to the second antenna port 306b. The first antenna port 306a and the second antenna port 306b may be any two antenna ports 306a-306b. Respectively, the first antenna element 332a connected to the respective first antenna port 306a and the second antenna element 332b connected to the respective second antenna port 306b may be any two antenna elements 332a-332n of the at least one antenna array 330.

Figure 6A:
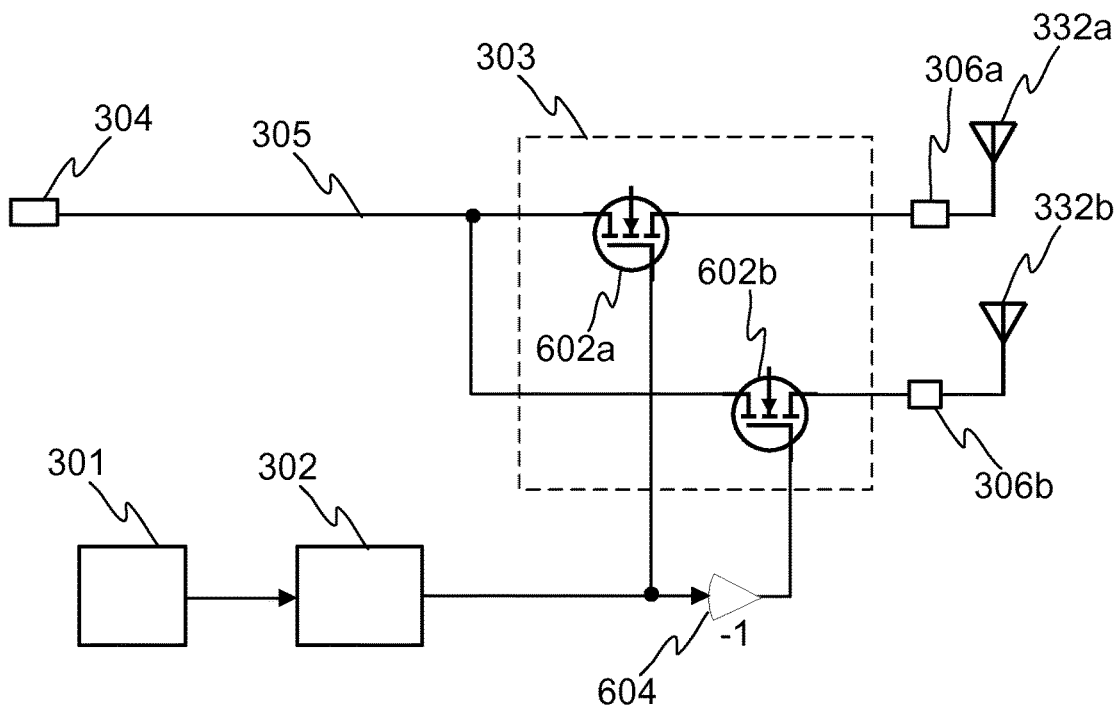
FIGS. 6A-6D illustrate schematically examples of an antenna soft switching system according to the invention.

FIG. 6A illustrates an example embodiment of the antenna soft switching system 310 according to the invention, wherein the switching network 303 is implemented as a part of the antenna switch configured to perform the switching of the RF signal from the first antenna port 306a to the second antenna port 306b, i.e. the switching network 303 is the switching network of the antenna switch configured to change active antenna port from the first antenna port 306a to the second antenna port 306b and correspondingly change active antenna element from the first antenna element 332a to the second antenna element 332b. In other words, the switching network 303 may be configured to activate the second antenna port 306b and the antenna element 332b connected to the second antenna port 306b and to inactivate, i.e. disconnect, the first antenna port 306a and the antenna element 332a connected to the first antenna port 306. The generator unit 302 is configured to control the switching network 303 during the switching event so that the amplitude of the RF signal 305 at the first antenna port 306a is substantially smoothly ramped down, i.e. decreased, and simultaneously the amplitude of the RF signal 305 at the second antenna port 306b is substantially smoothly ramped up, i.e. increased. The switching network 303 may comprise at least two switching devices 602a, 602b. The at least two switching devices 602a, 602b may be resistive switching devices, fully reactive switching devices, partially reactive switching devices, or active switching devices. The at least two resistive switching devices 602a, 602b may utilize junction gate field-effect transistors (JFETs), Metal-oxide-semiconductor field-effect transistors (MOSFETs), metal-semiconductor field-effect transistors (MESFETs); pseudo-morphic high electron mobility transistors (PHEMTs); PIN diodes, or any other suitable RF switches.

Figure 7A:
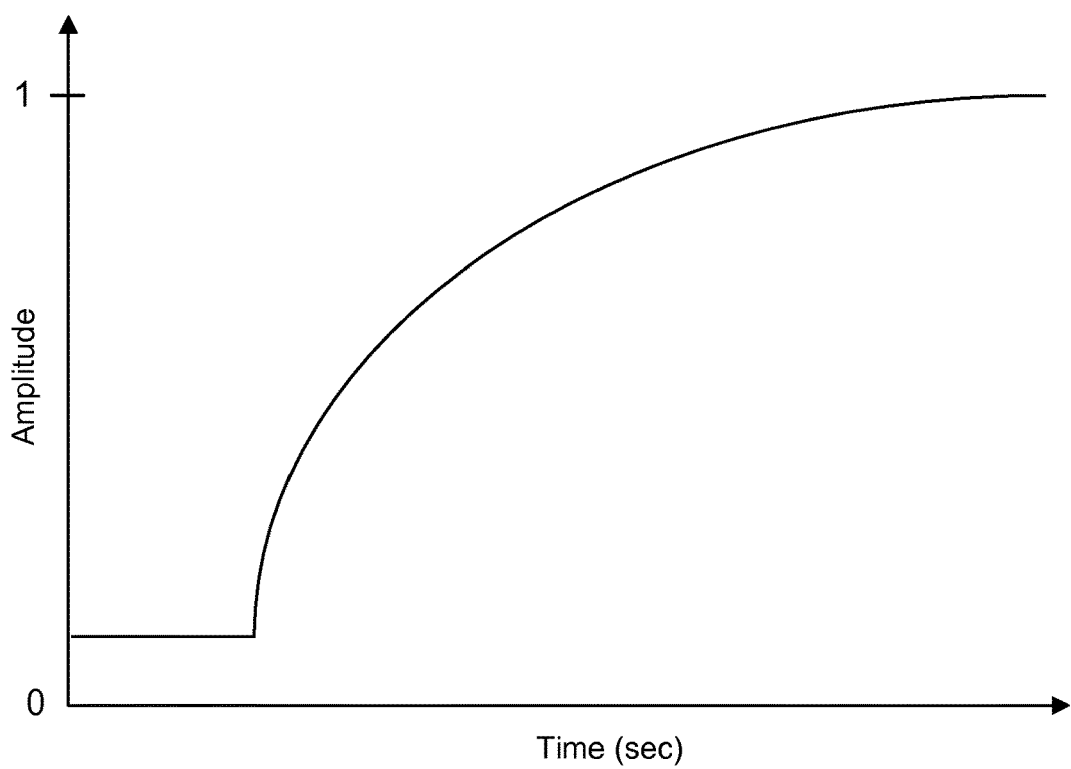
FIG. 7A illustrates schematically an example of a time domain amplitude of RF waveform of a switching device with a linear ramp waveform.
Figure 8A:
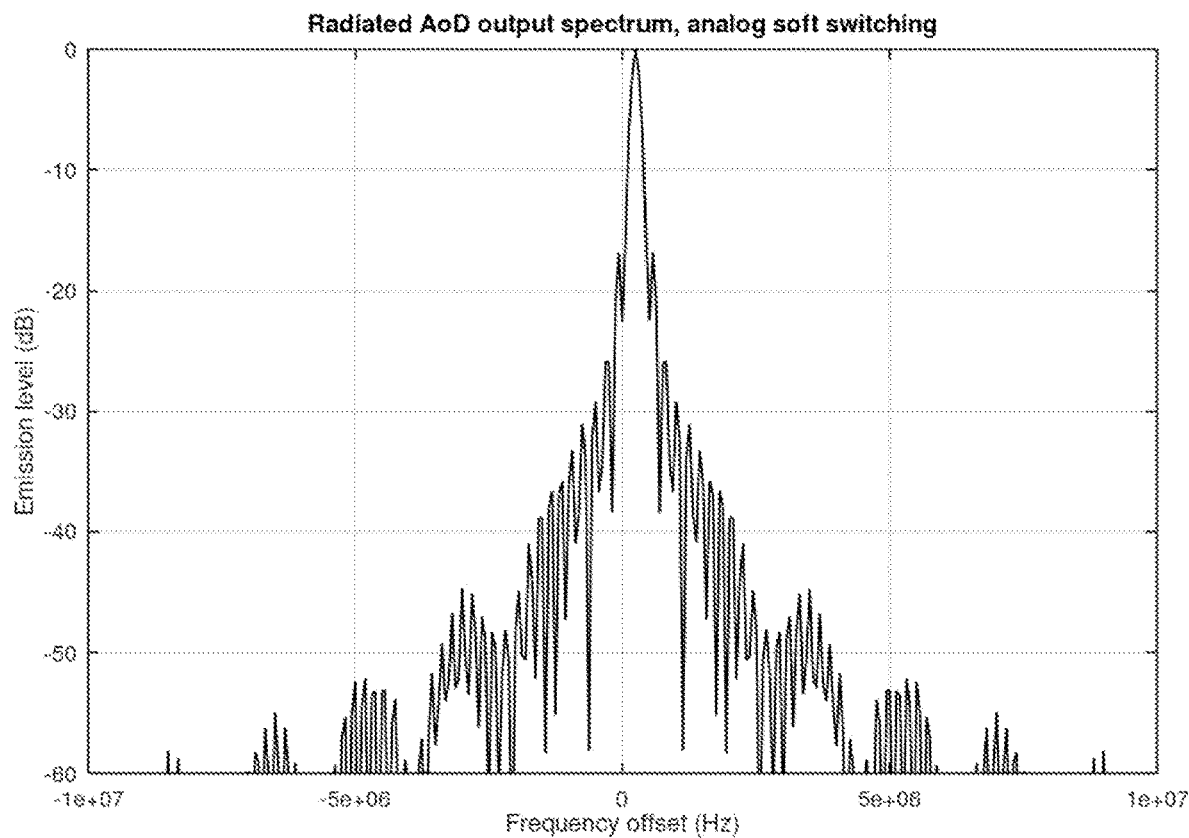
FIG. 8A illustrates an example of a resulting transmitted RF spectrum with an analog soft switching system according to the invention.

In the example antenna soft switching system 310 of FIG. 6A the generator unit 302 comprises an analog ramp generator and the two switching devices 602a, 602b are JFET, MOSFET, MESFET or PHEMT transistors. The transistors may be operated in a linear "triode" region, when used as a switching device 602a, 602b. In this region the channel of the switching device 602a, 602b acts as a variable resistor, which value is dependent on the gate voltage (Vgs) of the switching device 602a, 602b. By ramping up/down, i.e. increasing/decreasing, the gate voltage slowly during the switching event, i.e. during the switch slot 430a-430n, causes also RF attenuation of the switching device 602a, 602b to vary smoothly in proportion to the Rds/Vgs transfer function of the switching device 602a, 602b, wherein Rds is the resistance of the transistor. This smooth switching then reduces the out-of-channel spectral emissions of the transmitted RF spectrum in comparison to instantaneous on/off switching between the first antenna port 306a and the second antenna port 306b. In this example antenna soft switching system 310 the gate voltage of the switching device 602a ramps down when the gate voltage of the switching device 602b ramps up and vice versa. The waveforms of the gate voltages of the switching devices 602a, 602b are used as control signals of the switching devices 602a, 602b. FIG. 7A schematically illustrates an example of a time domain amplitude of the RF waveform of the second switching device 602b during the switching event, wherein the control signal of the second switching device 602b is a linear ramp waveform generated by the analog ramp generator to smoothly ramp up the amplitude of the RF signal 305 at the second antenna port 306b. The same linear ramp waveform may be used to control the first switching device 602a and the second switching device 602b by arranging an inverting component 604, e.g. an inverting amplifier arrangement with a voltage gain arranged to 1, between the generator unit 302 and the second switching device 602b to invert the linear ramp waveform generated by the analog generator unit 302. As a result of the inversion of the waveform of the second switching device 602b is opposite to the waveform of the first switching device 602a in order to substantially smoothly ramp down the gate voltage of the switching device 602a when the gate voltage of the switching device 602b ramps up substantially smoothly. FIG. 8A illustrates an example of the resulting transmitted RF spectrum with the analog soft switching system 310 illustrated in FIG. 6A. From FIG. 8A may be seen that the level of the unwanted emissions of the transmitted RF spectrum are reduced in comparison to the instantaneous switching illustrated in FIG. 5. In the example of FIG. 8A the level of the out-of-channel spectral emissions may be approximately between −40 dB and −18 dB with small offset frequencies (less than ±2.5 MHz from the transmit frequency) and approximately between −60 dB and −40 dB with higher offset frequencies (between ±2.5 MHz-±10 MHz).

Different switching devices 602a, 602b require different control signals depending on the characteristics of the particular switching device. For example, if the switching device 602a, 602b is a PIN diode, the switch resistance may be controlled by DC or low-frequency current through the PIN diode. If the waveform is generated analogically by the generator unit 302, the shape of the waveform may be practically limited to some simple waveforms, such as a linear ramp waveform. Also, the Rds/Vgs characteristics of the switching device 602a, 602b may have an impact on the resulting RF waveform of the switching device 602a, 602b.

Figure 6B:
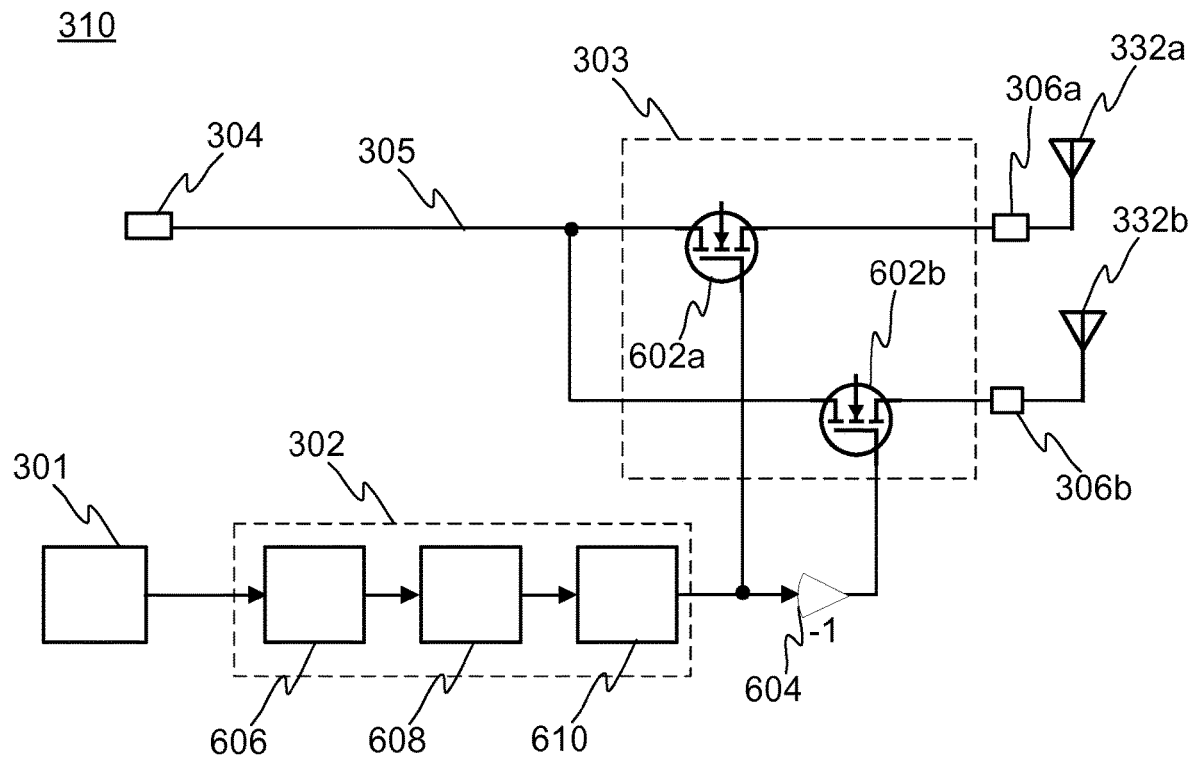

More complicated waveforms may be generated digitally, which digital waveform may be converted into analog waveform by means of a digital to analog (D/A) converter. FIG. 6B illustrates another example embodiment of the antenna soft switching system 310 according to the invention, wherein the generator unit 302 comprises a digital waveform generator 606, a D/A converter 608, and a reconstruction filter 610. The output of the D/A converter needs to be filtered to remove aliases and fed to the switching devices 602a, 602b, e.g. to the gates of transistor switching devices. Generating the waveform digitally requires some additional hardware, such as storage, e.g. a memory of the generator unit 302 or generating function for the waveform, the D/A converter 608, and the reconstruction filter 610, as well as the timing unit 301 needs to run at a higher clock rate than the actual switching frequency. Moreover, in digital soft switching the timing unit 301 may further be configured to time the events of the whole sequence of switching events comprising timings of e.g. reading the samples of the waveform from the memory of the generator unit 302, updating the control signals of the switching devices 602a, 602b, etc. Otherwise, the operation of the soft switching system 310 of FIG. 6B is similar with the soft switching system 600 of FIG. 6A.

Figure 6C:
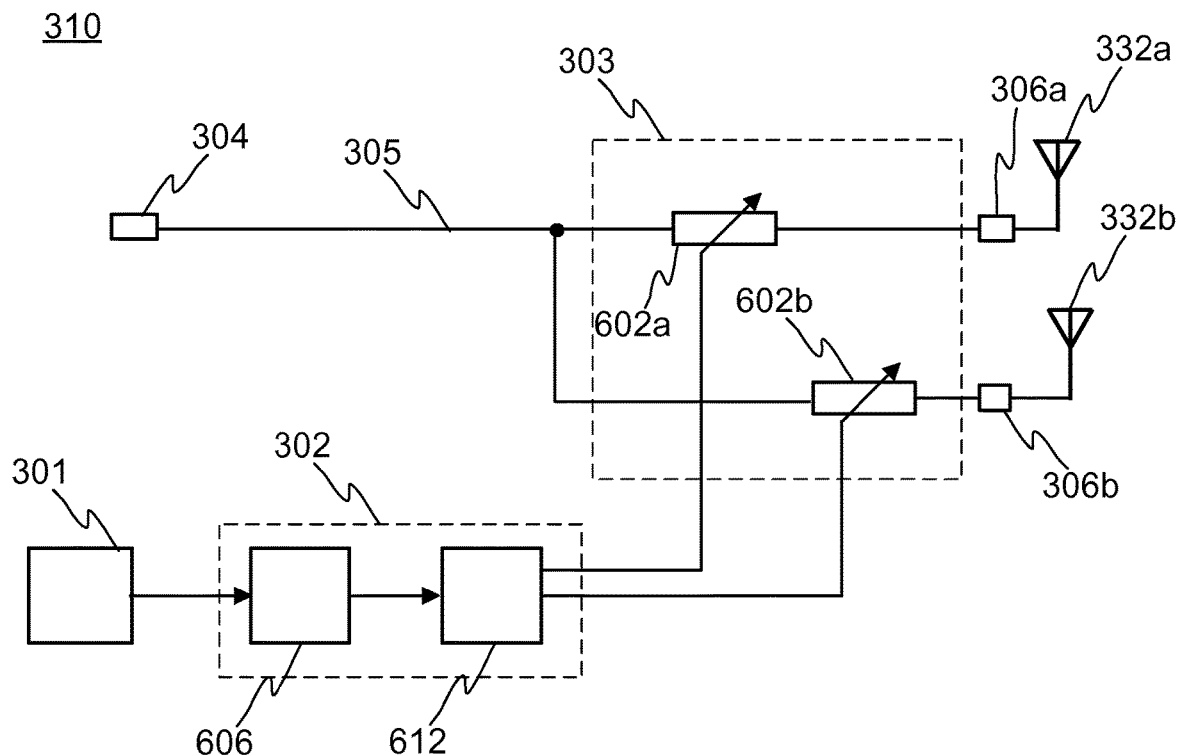
Figure 7B:
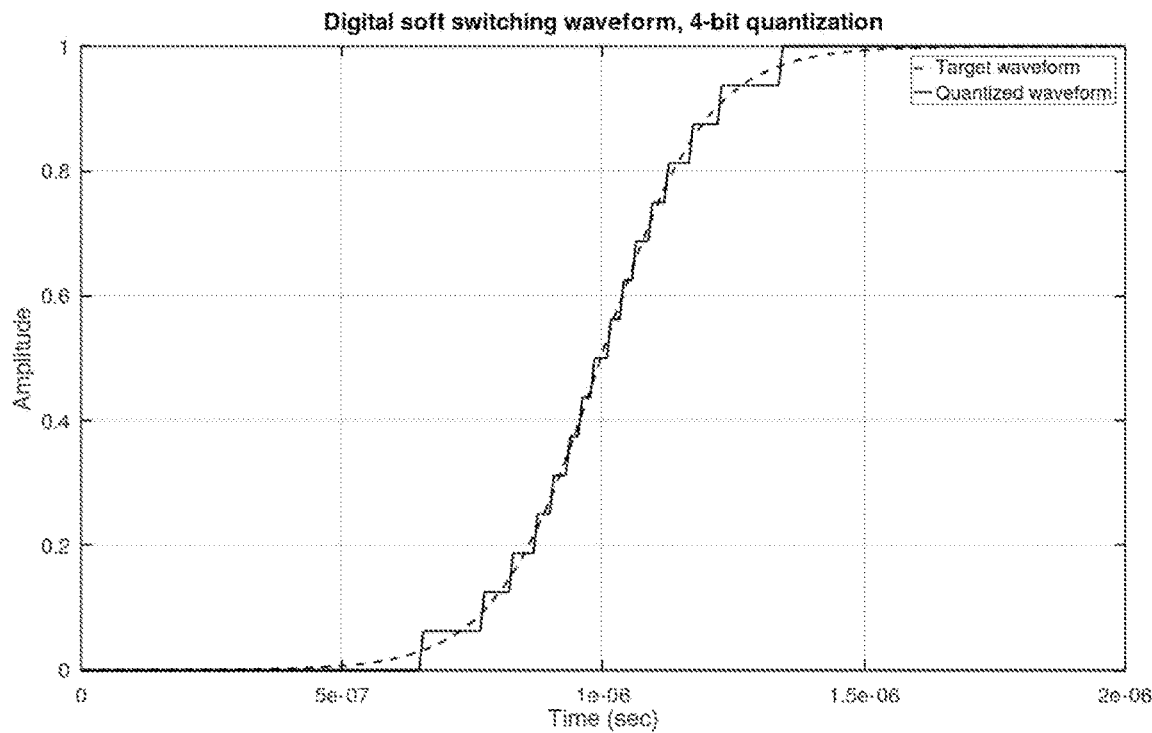
FIG. 7B illustrates schematically an example of a time domain amplitude of RF waveform of a switching with a quantized linear ramp waveform.
Figure 8B:
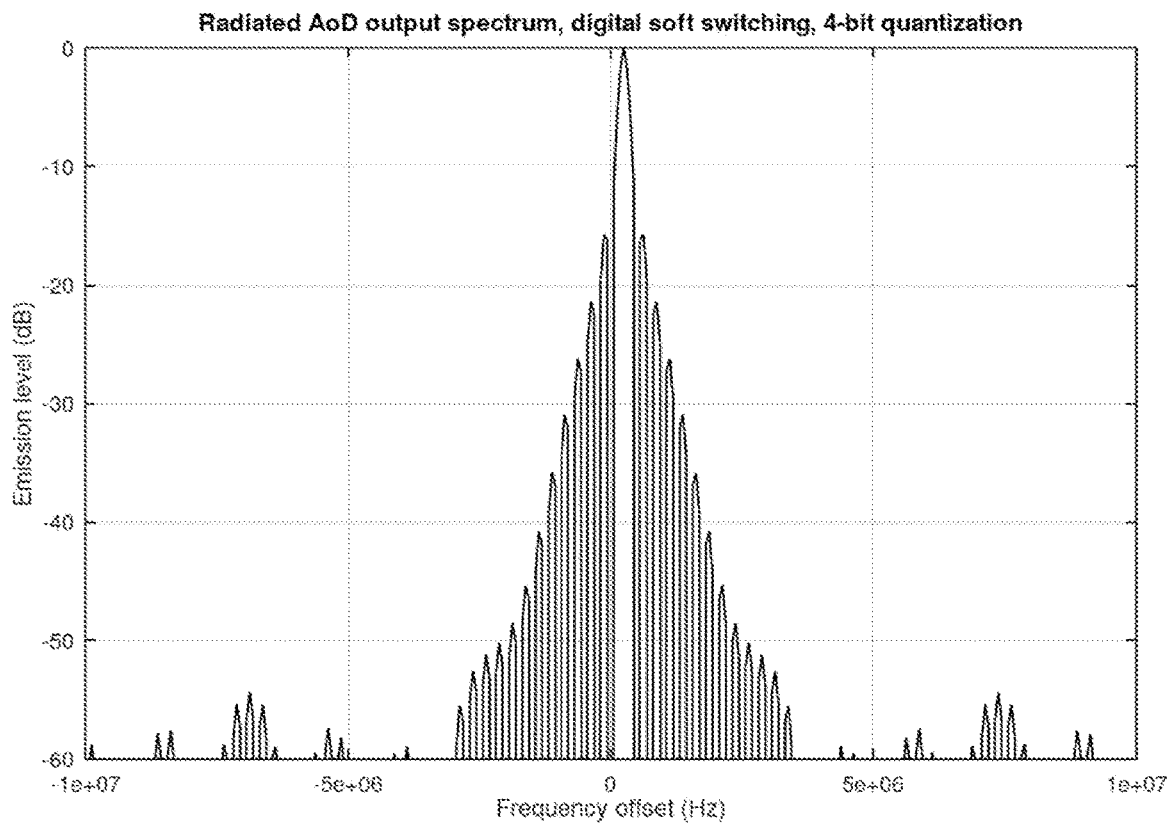
FIG. 8B illustrates an example of a resulting transmitted RF spectrum with a digital soft switching system according to the invention.
Figure 8C:
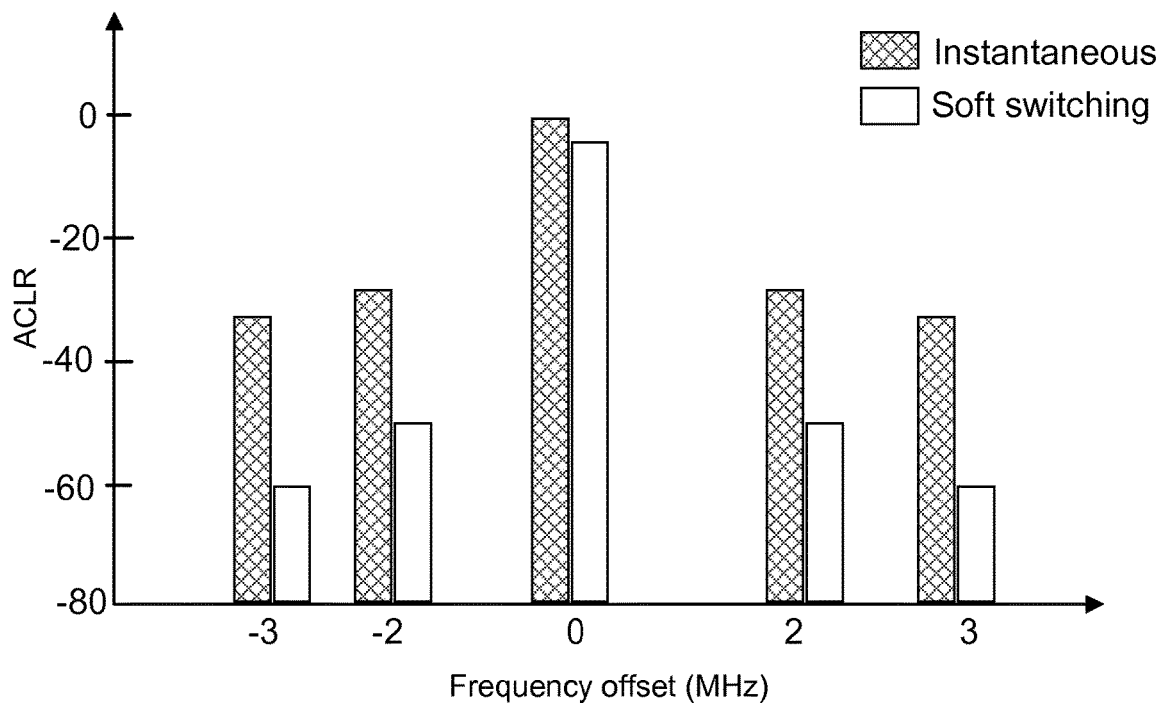
FIG. 8C illustrates an example of adjacent-channel leakage ratio (ACLR) with instantaneous switching and digital soft switching according to the invention.
Figure 9:
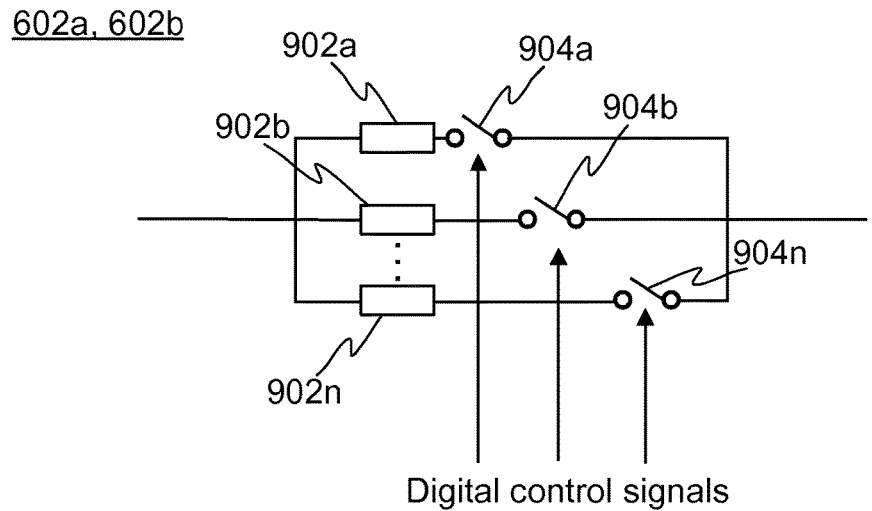
FIG. 9 illustrates schematically an example of a switching device implemented as a digitally controlled attenuator.

Alternatively, instead of using the resistive switching devices the at least two switching devices 602a, 602b may be digitally controlled attenuators. FIG. 6C illustrates another example embodiment of the antenna soft switching system 310 according to the invention, wherein the switching network 303 comprises at least two resistive switching devices 602a, 602b implemented as digitally controlled attenuators and the generator unit 302 comprises a digital waveform generator 606. The switching device 602a, 602b implemented as the digitally controlled attenuator may be constructed from multiple resistive elements 902a-902n that are connected in series or parallel using controllable switching elements 904a-904n, such as JFET, MOSFET, MESFET or PHEMT transistors. The topology of the digitally controlled attenuator may be series, parallel, L-network, pi-network, T network, etc. FIG. 9 illustrates schematically an example of a switching device implemented as a digitally controlled attenuator. The controllable switching elements 904a-904n that are used for selecting the resistive elements 902a-902n may be controlled digitally according to a predetermined timing pattern. The generator unit 302 may further comprises a waveform encoder 612 configured to convert the waveform generated by the digital waveform generator 606 into control signals of the individual controllable switching elements 904a-904n. Especially, when the number of controllable switching elements 904a-904n is higher than the word length of individual samples of the waveform, the use of waveform encoder 612 preferable in comparison to generating directly the control signals of the individual controllable switching elements or storing the control signals of the individual controllable switching elements in the memory of the generator unit 302. The resulting RF waveform resembles a staircase, i.e. quantized waveform, with steps small enough to have reduced RF spectrum. In other words, the quantized waveform enables substantially smooth switching of the amplitude of the RF signal 305 from the first antenna port 306a to the second antenna port 306b. The word length means the resolution, i.e. dynamic accuracy, of the digital sample that has been taken, e.g. the word length may be 4-bits to 24 bits. FIG. 7B schematically illustrates an example of a time domain amplitude of RF waveform of the switching device 602b during the switching event, wherein the control signal of the second switching device 602b is a quantized linear ramp waveform generated by the generator unit 302 comprising the digital generator 606 and the waveform encoder 612 to substantially smoothly ramp up the amplitude of the RF signal 305 at the second antenna port 306b. The target waveform is illustrated with dashed line and the quantized waveform is illustrated with solid (staircase) line. From FIG. 7B it may be seen that although the quantized waveform is formed by small steps, it approximates the target ramp waveform, i.e. the quantized waveform enables substantially smooth ramping up of the amplitude of the RF signal 305 at the second antenna port 306b. In this example, 4-bit quantization is used, but also any other quantization may be used. FIG. 8B illustrates an example of the resulting transmitted RF spectrum with the digital soft switching system 310 illustrated in FIG. 6C. From FIG. 8B may be seen that the level of the unwanted emissions of the transmitted RF spectrum are reduced in comparison to the instantaneous switching illustrated in FIG. 5 and almost as good reduction of the level of the unwanted emissions of the transmitted RF spectrum is achieved as with the analog soft switching as illustrated in FIG. 8A. In the example of FIG. 8B the level of the out-of-channel spectral emissions may be approximately between −45 dB and −15 dB with small offset frequencies (less than ±2.5 MHz from the transmit frequency) and approximately −60 dB with higher offset frequencies (between ±2.5 MHz-±10 MHz). FIG. 8C illustrates an example of adjacent-channel leakage ratio (ACLR) at the transmitting frequency and at different offset frequencies with the digital soft switching system 310 illustrated in FIG. 6C. As comparison in FIG. 8C the ACLR with the instantaneous switching is illustrated. In this example, the improvement in the ACLR with the digital soft switching system 310 at the offset frequencies is 20 dB or even more when compared to instantaneous, i.e. hard, switching.

Figure 6D:
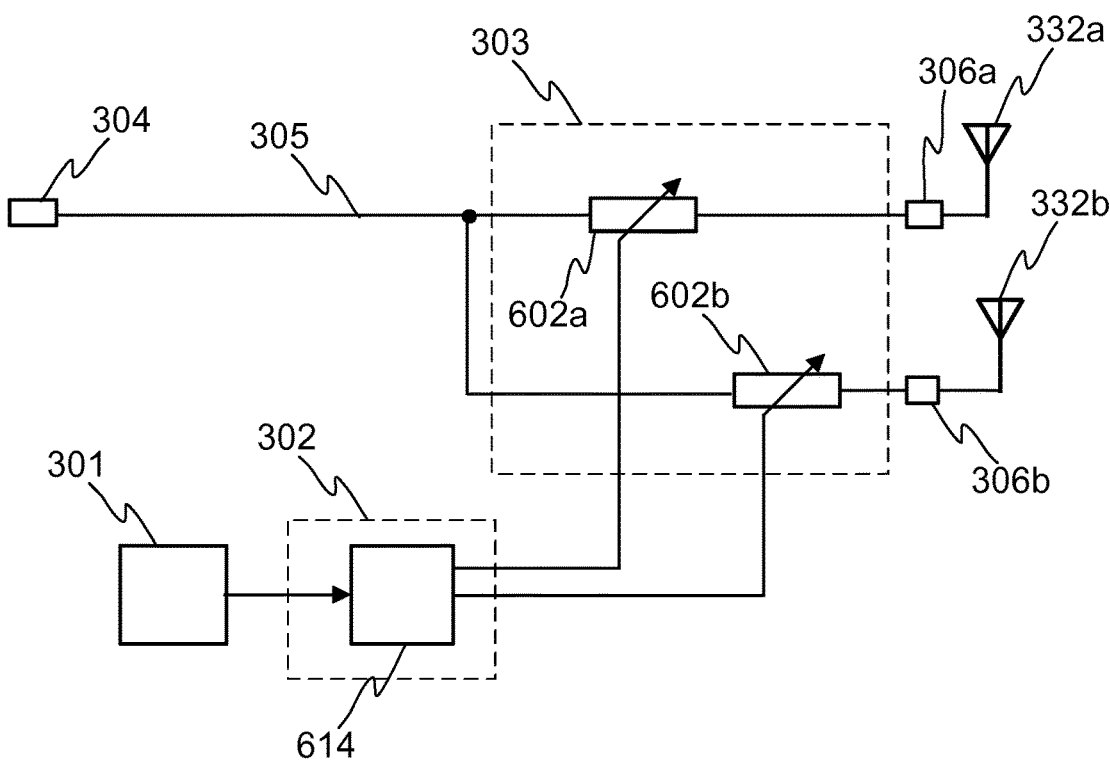

FIG. 6D illustrates another example embodiment of the antenna soft switching system 310 according to the invention, wherein the generator unit 302 comprises a counter 614 and the waveform is encoded into the at least two switching devices 602a, 602b, i.e. the values of the resistive elements 902a-902n of the switching devices 602a, 602b may be defined such that the resulting RF waveform approximates a desired waveform when the control signal is simply an ascending or descending count. This may simplify the generator unit 302, because there is no need to store the waveform in the memory of the generator unit 302. Otherwise the operation of the soft switching system 310 of FIG. 6D is similar with the soft switching system 310 of FIG. 6C.

There may be situations where having the resistive switching elements 602a, 602b at the antenna ports 306a, 306b is not practical due to size, cost or RF performance reasons. This may be the case especially with the digitally controlled attenuators, e.g. as in the example antenna soft switching systems 310 illustrated in FIGS. 6C and 6D. In that case it may be preferable to use a single centralized antenna soft switching system 1000 together with a switching network 1010 of the antenna switch comprising the plurality of switching devices of the antenna switch configured to select consecutively the antenna element 332a-332n of the at least one antenna array 330. In this case the antenna soft switching system 1000 may steer the RF signal 305 into a dummy load 1020 of a reference port 1030 and the changing of the antenna element 332a, 332b takes place at a moment when there is no RF signal 305 present at any antenna port 306a, 306b.

Figure 10:
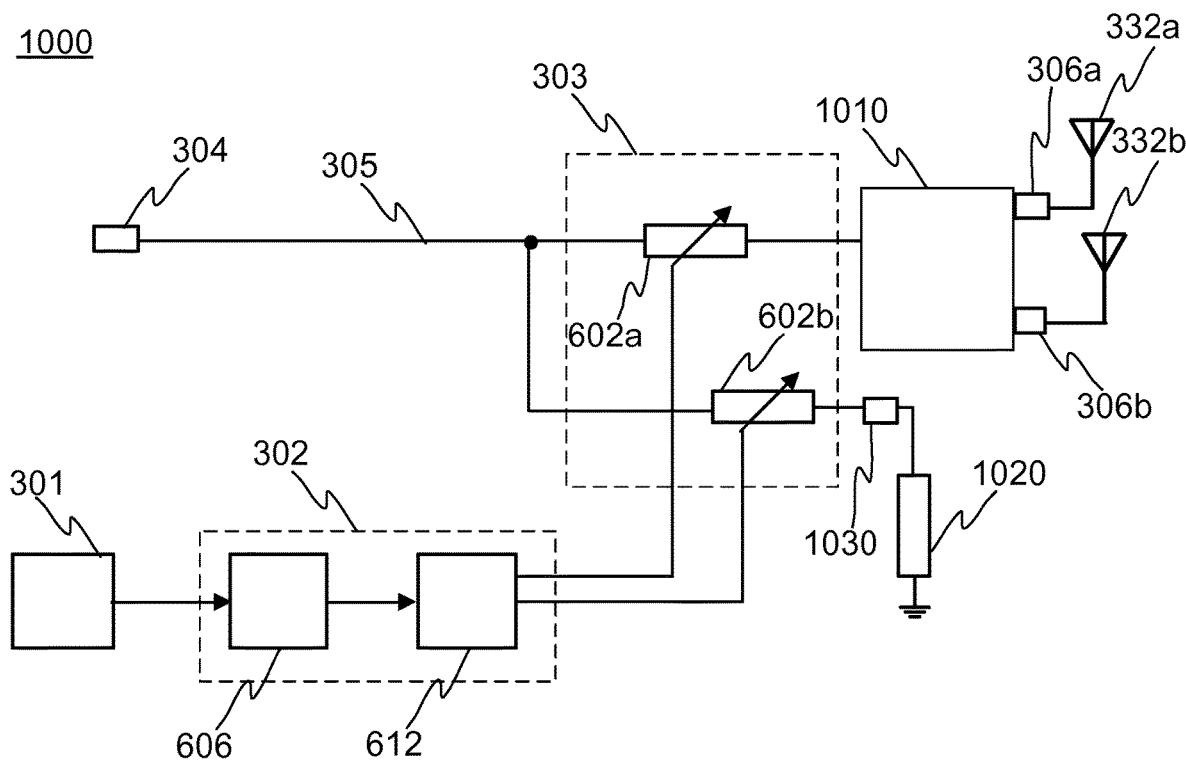
FIG. 10 illustrates another example of an antenna soft switching system according to the invention.
Figure 11:
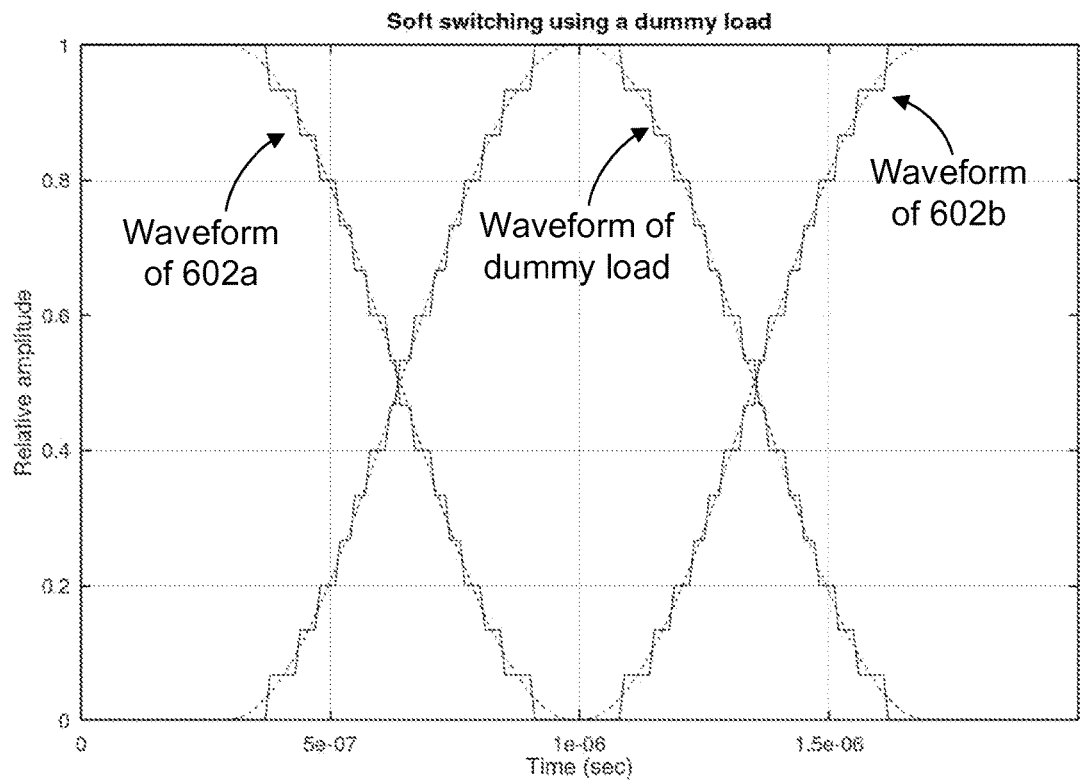
FIG. 11 illustrates schematically examples of RF waveforms of switching devices and a dummy load with a quantized linear ramp waveform.

FIG. 10 illustrates an example embodiment of the antenna soft switching system 1000 according to the invention, wherein the switching network 303 is a separate switching network providing a centralized antenna soft switching system 1000. The switching network 303 is separate from the switching network 1010 of the antenna switch, i.e. the plurality of switching devices of the antenna switch configured to select consecutively the antenna element 332a-332n of the at least one antenna array 330. The generator unit 302 may be configured to control the switching network 303 so that the amplitude of the RF signal 305 at the first antenna port 306a is substantially smoothly ramped down and simultaneously the amplitude of the RF signal 305 at the reference port 1030 is ramped up substantially smoothly. The switching network 1010 of the antenna switch is configured to change the active antenna port and the active antenna element by connecting the RF signal path 305 from the first antenna port 306a to the second antenna port 306b while the RF signal 305 is led to the dummy load 1020 of the reference port 1030. After that the generator unit 302 may be configured to control the switching network 303 so that the amplitude of the RF signal 305 at the reference port 1030 is substantially smoothly ramped down and simultaneously the amplitude of the RF signal 305 at second antenna port 306b is substantially smoothly ramped up. In the example antenna soft switching system 1000 of FIG. 10 the generator unit 302 comprises a digital waveform generator 606 and a waveform encoder 612. FIG. 11 schematically illustrates examples time domain amplitudes of RF waveforms of the switching device 602a, switching device 602b, and the dummy load 1020 during the switching event, wherein the control signals of the switching devices 602a, 602b are quantized linear ramp waveforms generated by the generator unit 302 comprising the digital generator 606 and the waveform encoder 612.

One minor drawback of this embodiment may be that the RF signal 305 into the active antenna element, i.e. the first antenna element 332b, needs to be ramped down before the active antenna element is changed, and then ramped up again after the second antenna element 332b is activated. This means that the up/down ramps need to be twice as fast as in the embodiments, where the RF signal 305 is steered from one antenna element into another antenna element. For example, in the examples of FIGS. 7A and 7B the duration of the switching event is 2 microseconds, during which the RF signal 305 is steered from one antenna element into another element. In the example of FIG. 11 the duration of the switching event is also 2 microseconds, but during that the RF signal 305 is steered from one antenna element into the dummy load and from the dummy load into another antenna element. Nevertheless, the reduction of the unwanted emissions of the transmitted RF spectrum may still be achieved, if there is enough time available for the complete switching event.

According to one example embodiment of the invention, if the transmitter module 320 is linear, or benignly non-linear, the common centralized soft switching system 1000 may also be implemented in the analog or digital baseband of the transmitter module 320. This enables that there is no need to use a dummy load 1020 to absorb the RF signal, and the losses at high power level may be avoided.

Figure 12:
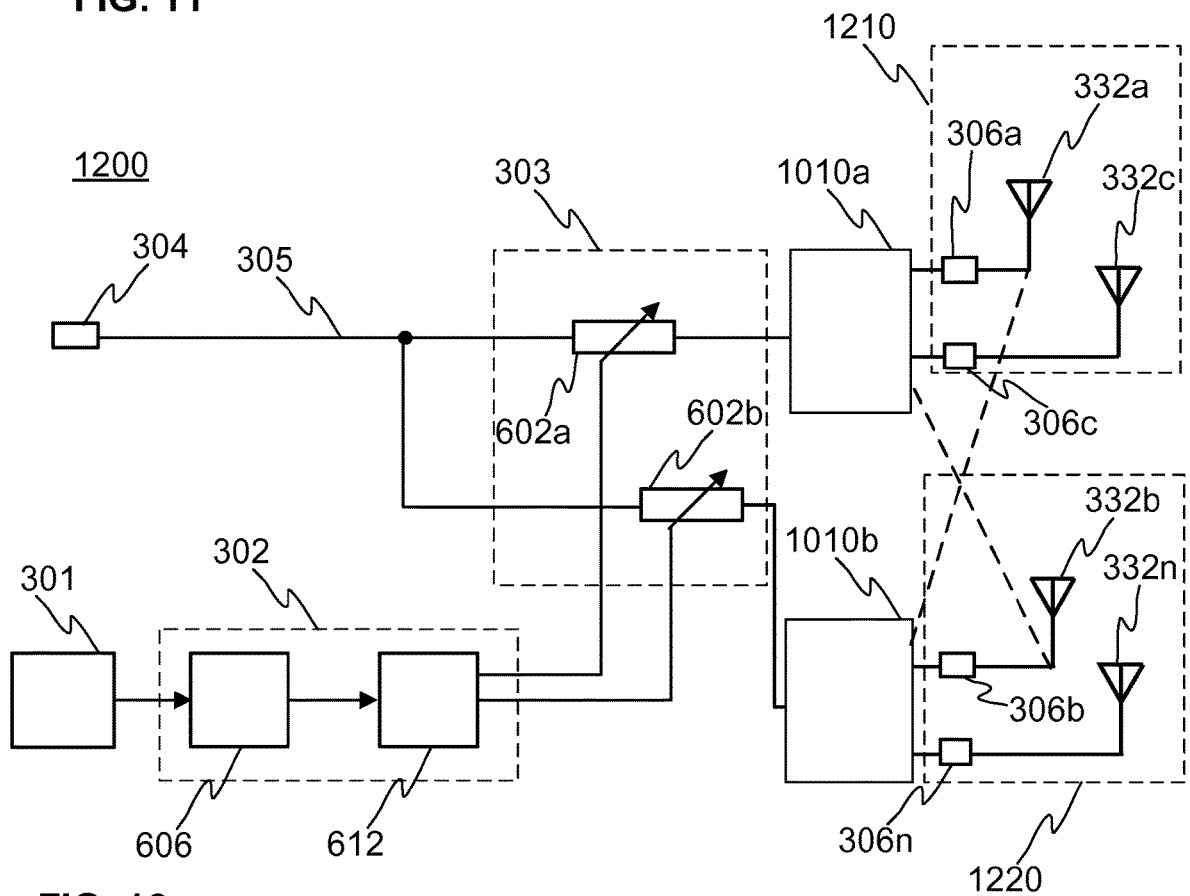
FIG. 12 illustrates another example of an antenna soft switching system according to the invention.

FIG. 12 illustrates an example embodiment of the antenna soft switching system 1200 according to the invention, wherein the switching network 303 is a separate switching network providing a centralized antenna soft switching system 1200 and the antenna ports 306a-306n and the antenna elements 332a-332n are arranged to two groups, wherein the first antenna port 306a and the respective first antenna element 332a belong to the first antenna group 1210 and the second antenna port 306b and the respective second antenna element 332b belong to the second antenna port group 1220. The switching network 303 is separate from the switching network 1010a of the first antenna group 1210 and the switching network 1010b of the second antenna group 1220 of the antenna switch, i.e. the plurality of switching devices of the antenna switch configured to select consecutively the antenna element 332a-332n of the at least one antenna array 330. The active antenna element 332a-332n may be selected alternately from the first antenna group 1210 and form the second antenna group 1220. The selection of the active antenna port and respective active antenna element of the antenna group may be performed when said antenna group is not active, i.e. the RF signal 305 is not led to said antenna group. For example, the second antenna port 306b may be preselected as the active antenna of the second antenna group 1220 by the switching network 1010b of the second antenna group 1220 when the RF signal is led to the first antenna group 1210. Alternatively, the first antenna port 306a may be pre-selected as the active antenna of the first antenna group 1210 by the switching network 1010a of the first antenna group 1220 when the RF signal 305 is led to the second antenna group 1220. To switch between the first antenna port 306a and the second antenna port 306b, the generator unit 302 may be configured to control the switching network 303 so that the amplitude of the RF signal 305 at the first antenna group 1210 (to which the first antenna port 306a belongs) is substantially smoothly ramped down and simultaneously the amplitude of the RF signal 305 at the second antenna group 1220 (to which the second antenna port 306b belongs) is substantially smoothly ramped up, wherein the second antenna port 306b is pre-selected as the active antenna of the second antenna group 1220. With this the above described drawback may be avoided. The two antenna groups 1210, 1220 do not need to be exclusive, i.e. any physical antenna element may belong to both groups, if access from both RF paths is provided by the antenna switches 1010a, 1010b (dashed lines between the first antenna element 332a and the switching network 1010b of the second antenna group 1220 and between the second antenna element 332b and the switching network 1010a of the first antenna group 1210 in FIG. 12). This enables flexible switching sequences, where the active antenna element may be selected arbitrarily at each switching event.

Above the different embodiments of the antenna soft switching system 310, 1000, 1200 are described by referring to JFET, MOSFET, MESFET or PHEMT transistors, PIN diodes, and/or digitally controlled attenuators as the at least two resistive switching devices 602a, 602b. Alternatively, fully or partially reactive, i.e. inductive or capacitive, switching devices 602a, 602b may be used in any of the embodiments of the invention described above. Alternatively, active switching elements 602a, 602b, e.g. amplifiers, may be used as the at least two resistive switching devices 602a, 602b in any of the embodiments of the invention described above. The transfer function, i.e. gain, of the active switching devices may be either continuously variable, i.e. analog control signals, or digitally programmable, i.e. digital control signals.

The connections, i.e. communicatively couplings, between any components, modules, and/or units according to the invention throughout this application (except between transmitter unit and receiver unit) may be based on any known wired communication technologies. The communication between the transmitter unit and receiver unit may be based on any known wireless communication technologies, e.g. Bluetooth low energy (BLE).

Figure 13:
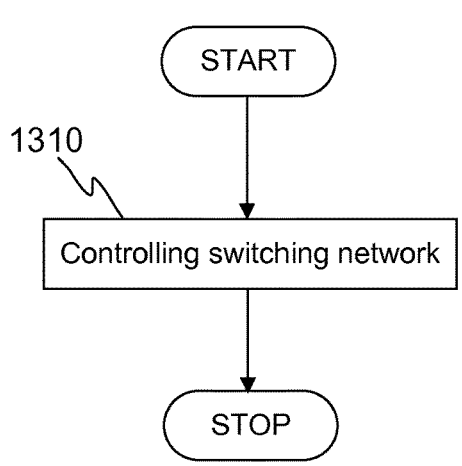
FIGS. 13-16 illustrate examples of a method according to the invention.
Figure 14:
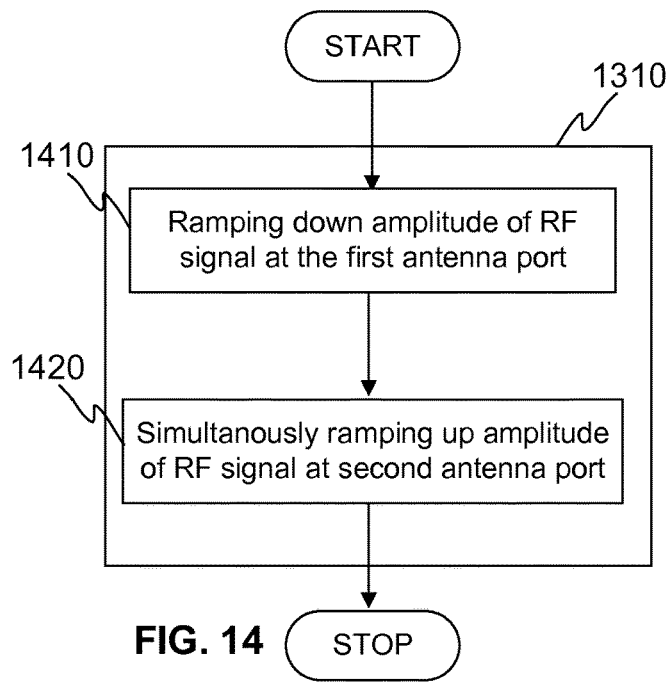
Figure 15:
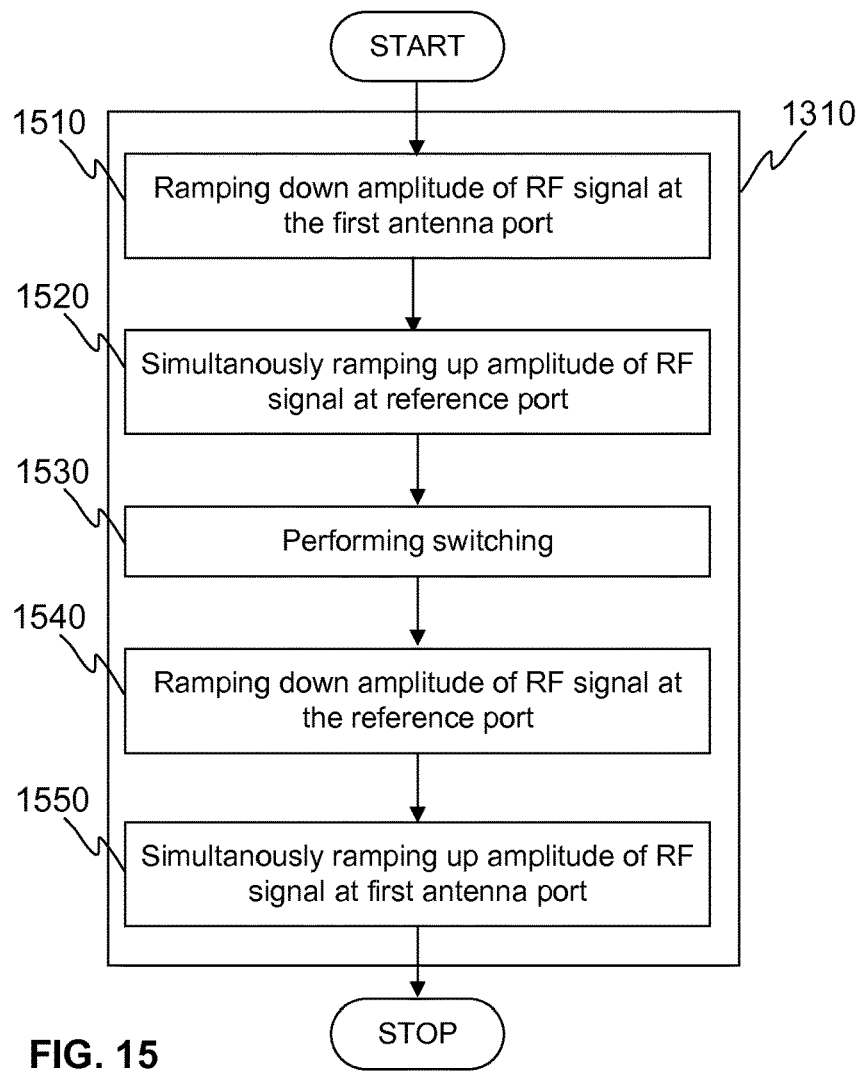
Figure 16:
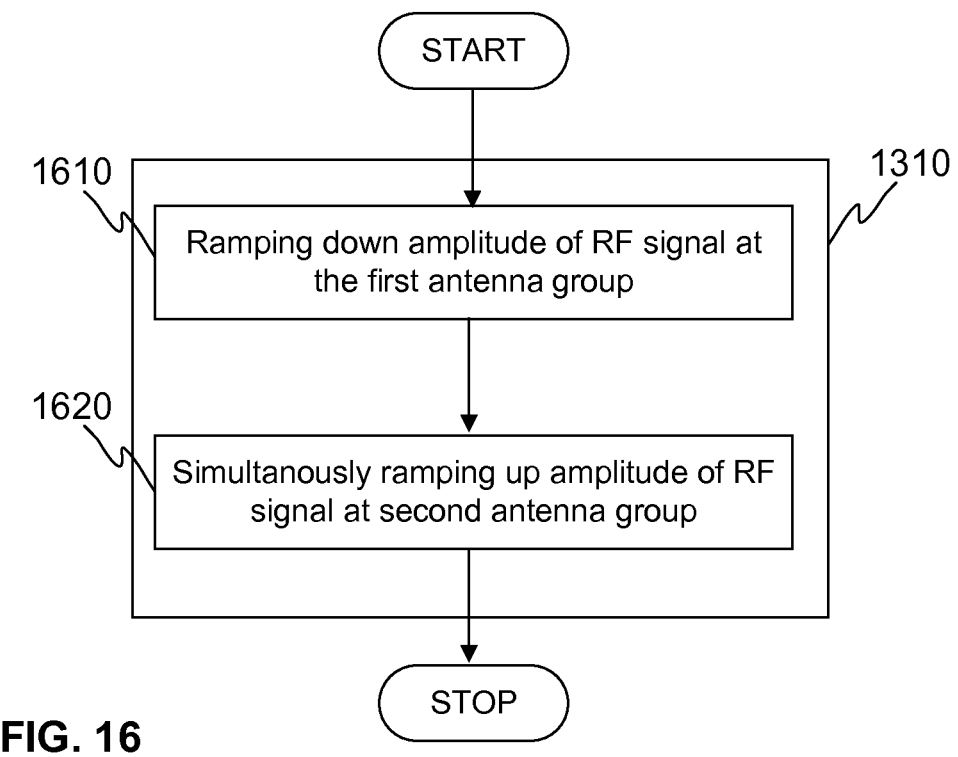

Above the invention is described relating to the antenna soft switching system of an AoD direction finding transmitter unit. Next an example of an antenna soft switching method according to the invention is described by referring to FIG. 13. The method comprises controlling 1310, by a waveform generated by a generator unit 302, the switching network 303 so that the amplitude of the RF signal is switched substantially smoothly, i.e. gradually, from the first antenna port to the second antenna port in order to reduce level of unwanted emissions of a radiated RF spectrum of the direction finding transmitter as described above. During the switching event the impedance seen by the at least one RF port 304 may be maintained constant. The controlling step 1310 will be described more referring to FIGS. 14-16 illustrating different embodiments of the method according to the invention.

According to an example embodiment of the method according to the invention, wherein the switching network 303 is implemented as a part of the antenna switch configured to perform the switching of the RF signal from the first antenna port 306a to the second antenna port 306b, i.e. the switching network 303 is the switching network of the antenna switch configured to change active antenna port from the first antenna port 306a to the second antenna port 306b and correspondingly change active antenna element from the first antenna element 332a to the second antenna element 332b (e.g. the example antenna soft switching systems 310 of FIGS. 6A-6D). In other words, the switching network 303 may be configured to switch the RF signal 305 from the first antenna port 306a to the second antenna port 306b in order to activate the second antenna port 306b and the antenna element 332b connected to the second antenna port 306b and to inactivate, i.e. disconnect, the first antenna port 306a and the antenna element 332a connected to the first antenna port 306. The controlling step 1310 may comprise: ramping down, i.e. decreasing, 1410 substantially smoothly the amplitude of the RF signal 305 at the first antenna port 306a, and simultaneously ramping up, i.e. increasing, 1420 substantially smoothly the amplitude of the RF signal 305 at the second antenna port 306a as discussed above. This example embodiment of the method according to the invention is illustrated in FIG. 14.

According to an example embodiment of the method according to the invention, wherein the switching network 303 is a separate switching network providing a centralized soft switching system 1000 (e.g. the example antenna soft switching system of FIG. 10). The switching network 303 is separate from the switching network 1010 of the antenna switch, i.e. the plurality of switching devices of the antenna switch configured to select consecutively the antenna element 332a-332n of the at least one antenna array 330. The controlling step 1310 may comprise: ramping 1510 down substantially smoothly the amplitude RF signal 305 at the first antenna port 306a and simultaneously ramping 1520 up substantially smoothly the amplitude of the RF signal 305 at a reference port 1030; changing, i.e. switching, 1530 active antenna port and the active antenna element by connecting by a switching network of the antenna switch, the RF signal path from the first antenna port 306a to the second antenna port 306b, while the RF signal 305 is led to the dummy load 1020 of the reference port 1030, ramping 1540 down substantially smoothly the amplitude of the RF signal 305 at the reference port 1030 and simultaneously ramping 1550 up substantially smoothly the amplitude of the RF signal 305 at second antenna port 306b as discussed above. This example embodiment of the method according to the invention is illustrated in FIG. 15.

Alternatively, according to an example embodiment of the method according to the invention, wherein the switching network 303 is a separate switching network providing a centralized antenna soft switching system 1200 and the antenna ports 306a-306n and the antenna elements 332a-332n are arranged to two groups, wherein the first antenna port 306a and the respective first antenna element 332a belong to the first antenna group 1210 and the second antenna port 306b and the respective second antenna element 332b belong to the second antenna port group 1220 (e.g. the example antenna soft switching system of FIG. 12). The controlling step 1310 may comprise: ramping 1610 down substantially smoothly the amplitude of the RF signal 305 at the first antenna group 1210, and simultaneously ramping 1620 up substantially smoothly the amplitude of the RF signal 305 at the second antenna group 1220, wherein the second antenna port 306b is pre-selected as the active antenna of the second antenna group 1220 as discussed above. This example embodiment of the method according to the invention is illustrated in FIG. 16.

There may be also some other applications for the above described antenna soft switching system and method in addition to the AoD transmitter unit 300. For example, the antenna soft switching system and method according to the invention may be used for smoothing of transmitter power on/off transients in time-domain duplex (TDD) radios with a single antenna. The antenna soft switching system 1000 of FIG. 10 and the respective antenna soft switching method of FIG. 15 may be the most suitable for this application. The antenna soft switching system 1000 may be used at any point of a linear transmitter chain, or between a power amplifier (PA) and the antenna in the case of a nonlinear PA. Alternatively, the antenna soft switching system and method according to the invention may be used as a programmable matched attenuator. The resistive at least two switching devises 602a, 602b may be dimensioned such that the switching network 303 maintains a constant impedance over the entire attenuation range. The antenna soft switching system 1000 of FIG. 10 and the respective antenna soft switching method of FIG. 15 may be the most suitable for this application. Alternatively, the antenna soft switching system and method according to the invention may be used for combining two or more antennas together into a single transmitter or receiver port, with adjustable power ratio between two antennas. This would be a lossy combiner in the case of resistive switching devices, but may be useful in some applications, such as beam-forming.

The present invention comprises an antenna soft switching system 310, 1000, 1200, of an AoD direction finding transmitter unit, an antenna soft switching method and an AoD direction finding transmitter unit comprising the antenna soft switching system 310, 1000, 1200. All these aspects of the invention comprise the same sub-features, sub-parts and sub-functionalities which are comprised in the dependent system claims.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An antenna soft switching system of an Angle of Departure, AoD, direction finding transmitter unit, wherein the antenna soft switching system is arranged between at least one radio frequency, RF, transmitter module and at least one antenna array, the soft switching system comprises:
   a timing unit for obtaining at least a starting time of a switching event,
   a switching network arranged on an RF signal path between an RF port and a first antenna port and a second antenna port, and
   a generator unit for generating at least one waveform for controlling the switching network,
   wherein the generator unit is configured to reduce a level of unwanted emissions of a transmitted RF spectrum of the AoD direction finding transmitter unit by controlling the switching network so that the amplitude of the RF signal is switched smoothly from the first antenna port to the second antenna port.

2. The soft switching system according to claim 1, wherein the switching network comprises at least two switching elements, the at least two switching elements are resistive switching devices, fully reactive switching devices, partially reactive switching devices, or active switching devices.

3. The soft switching system according to claim 2, wherein the at least two switching devices utilize junction gate field-effect transistors, JFETs; Metal-oxide-semiconductor field-effect transistors, MOSFETs; metal—semiconductor field-effect transistors, MESFETs; pseudomorphic high electron mobility transistors, PHEMTs; PIN diodes; or any other suitable RF switching devices.

4. The soft switching system according to claim 1, wherein the generator unit comprises an analog ramp generator.

5. The soft switching system according to claim 1, wherein the generator unit comprises a digital waveform generator, a digital to analog converter, and a reconstruction filter.

6. The soft switching system according to claim 1, wherein the at least two resistive switching devices are digitally controlled attenuators.

7. The soft switching system according to claim 6, wherein the generator unit comprises a digital waveform generator and a waveform encoder-configured to convert the waveform generated by the digital waveform generator into control signals of the digitally controlled attenuators.

8. The soft switching system according to claim 6, wherein the generator unit comprises a counter and the waveform is encoded into the at least two switching devices.

9. The soft switching system according to claim 1, wherein the switching network is implemented as a part of an antenna switch configured to change active antenna port from the first antenna port to the second antenna port during the switching event, wherein the generator unit is configured to control the switching network so that:
   the amplitude of the RF signal at the first antenna port is smoothly ramped down, and
   simultaneously the amplitude of the RF signal at the second antenna port is smoothly ramped up.

10. The soft switching system according to claim 1, wherein the switching network is a separate switching network providing a centralized soft switching system, wherein the generator unit is configured to control the switching network so that:
   the amplitude of the RF signal at the first antenna port is smoothly ramped down, and
   simultaneously the amplitude of the RF signal at a reference port is ramped up smoothly, wherein the antenna switch is configured to changing active antenna port while the RF signal is led to the reference port, and
   wherein the generator unit is further configured to control the switching network so that the amplitude of the RF signal at the reference port is smoothly ramped down and simultaneously the amplitude of the RF signal at second antenna port is smoothly ramped up.

11. The soft switching system according to claim 1, wherein the switching network is a separate switching network providing a centralized soft switching system and the first antenna port belongs to a first antenna group and the second antenna port belongs to a second antenna group, wherein the generator unit is configured to control the switching network so that:
   the amplitude of the RF signal at the first antenna group is smoothly ramped down,
   and simultaneously the amplitude of the RF signal at the second antenna group is smoothly ramped up, wherein the second antenna port is pre-selected as the active antenna of the second antenna group.

12. An Angle of Departure, AoD, direction finding transmitter unit-comprising the antenna soft switching system according to claim 1.

13. An antenna soft switching method for an AoD direction finding transmitter unit, wherein the antenna soft switching is performed between at least one radio frequency, RF, transmitter module and at least one antenna array, the method comprises reducing a level of unwanted emissions of a transmitted RF spectrum of the AoD direction finding transmitter unit by controlling, by a waveform generated by a generator unit, a switching network so that the amplitude of an RF signal is switched smoothly from a first antenna port to a second antenna port.

14. The soft switching method according to claim 13, wherein the switching network is implemented as a part of an antenna switch changing active antenna port from the first antenna port to the second antenna port during the switching event, wherein the controlling of the switching network comprises:
   ramping down smoothly the amplitude of the RF signal at the first antenna port, and
   simultaneously ramping up smoothly the amplitude of the RF signal at the second antenna port.

15. The soft switching method according to claim 13, wherein the switching network is a separate switching network providing a centralized soft switching system, wherein the controlling of the switching network comprises:
- ramping down smoothly the amplitude RF signal at the first antenna port,
- simultaneously ramping up smoothly the amplitude of the RF signal at a reference port,
- changing, by a switching network of an antenna switch, active antenna port from the first antenna port to the second antenna port, while the RF signal is led to the reference port,
- ramping down smoothly the amplitude of the RF signal at the reference port, and
- simultaneously ramping up smoothly the amplitude of the RF signal at second antenna port.

16. The soft switching method according to claim 13, wherein the switching network is a separate switching network providing a centralized soft switching system and the first antenna port belongs to a first antenna group and the second antenna port belongs to a second antenna group, wherein the method comprises:
- ramping down smoothly the amplitude of the RF signal at the first antenna group, and
- simultaneously ramping up smoothly the amplitude of the RF signal at the second antenna group, wherein the second antenna port is pre-selected as the active antenna of the second antenna group.

* * * * *